Dec. 10, 1940.   C. E. WAGNER   2,224,325
STEAM GENERATOR
Filed Sept. 25, 1939   2 Sheets-Sheet 1
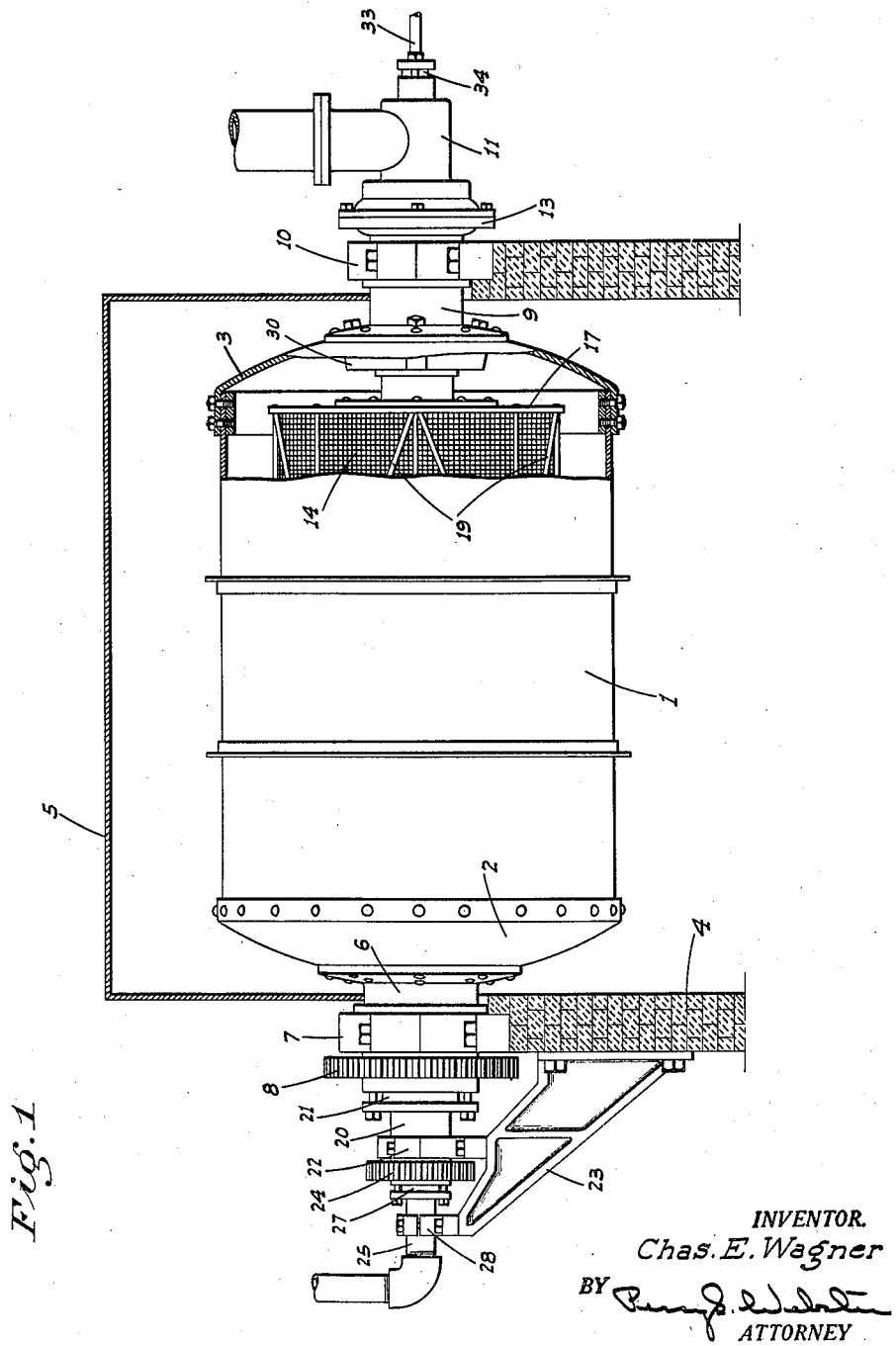
INVENTOR.
Chas. E. Wagner
BY
ATTORNEY Dec. 10, 1940.　　　C. E. WAGNER　　　2,224,325
STEAM GENERATOR
Filed Sept. 25, 1939　　　2 Sheets-Sheet 2
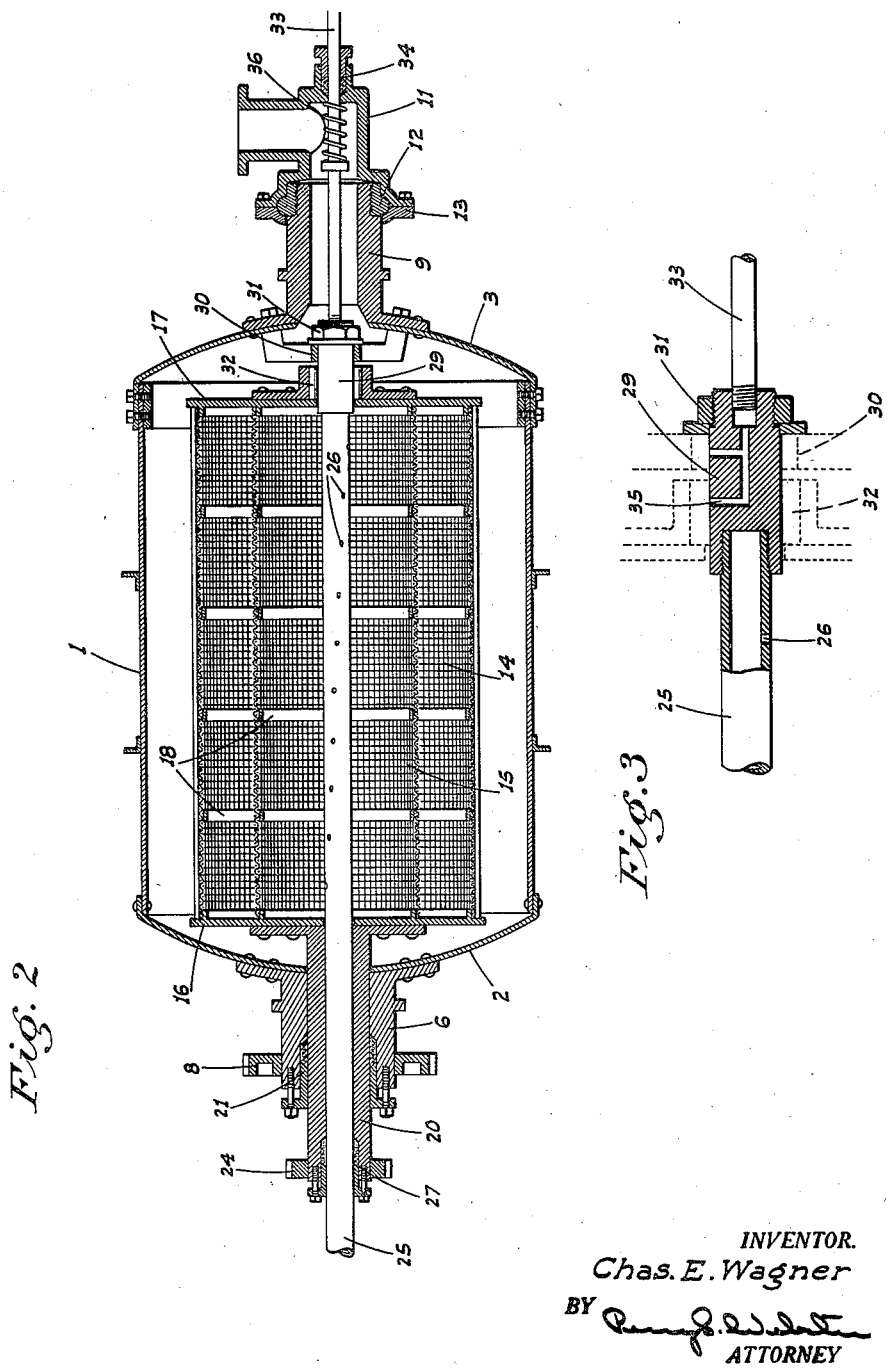
INVENTOR.
Chas. E. Wagner
BY
ATTORNEY Patented Dec. 10, 1940

2,224,325

UNITED STATES PATENT OFFICE 2,224,325

STEAM GENERATOR

Charles E. Wagner, Benicia, Calif.

Application September 25, 1939, Serial No. 296,330

11 Claims. (Cl. 122—11)

This invention relates to steam generators of the flash type, my major object being to provide a generator of this general type so constructed that a large volume of dry steam may be continually and quickly generated, without the use of tubes and the like which are apt to give trouble at some time or other.

Another object is to provide a generator in which the cooperating units are so mounted in relation to each other as to be capable of being easily and quickly assembled or taken apart.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of my improved generator, partly in section and shown as mounted in connection with a fire chamber.

Figure 2 is a longitudinal section of the generator, detached.

Figure 3 is a fragmentary section of the water and oil feed unit.

Referring now more particularly to the characters of reference on the drawings, the generator comprises a drum-like steam expanding chamber and consisting of a cylindrical body 1 made of heavy boiler plate and end heads 2 and 3. The head 2 is permanently secured to the body, but the head 3 is removably connected thereto in any suitable manner and so as to have a steam tight fit therewith.

The steam generator is disposed in a horizontal position within a firebox 4, said firebox including a removable hood 5 enclosing the generator above its horizontal axis. The head 2 is provided with an outwardly projecting tubular hub 6 journaled in a bearing 7 supported from the adjacent wall of the firebox. A driving gear 8 through the medium of which the body 1 may be rotated at a slow speed (about 3 R. P. M.) is mounted on the hub beyond the bearing. The head 3 is likewise provided with a tubular hub 9 journaled in a bearing 10 mounted on the adjacent wall of the firebox.

A stationary steam outlet fitting 11, preferably of elbow form, is disposed with one end alined with the outer end of hub 9, the latter having a packing member 12 mounted therein which is detachably engaged and enclosed in relatively turnable relation by a split collar 13 on the fitting 11.

Disposed within the body 1 coaxial therewith is a rotary vaporizing unit which includes an outer cylindrical screen 14 and an inner cylindrical screen 15, both screens being secured in common on solid end heads 16 and 17. Intermediate the heads, the screens are reinforced against sagging by bands 18, while the unit is braced against torsional strains by spirally or diagonally extending straps 19 on the outside, as indicated in Fig. 1.

The head 16 is provided with a relatively long tubular hub 20, which turnably engages hub 6 and projects some distance beyond the same; a steam packing gland 21 being disposed between the hubs. Beyond hub 6, hub 20 is journaled in a bearing 22 supported from a bracket 23 mounted on the adjacent firebox wall, and beyond said bearing the hub 20 carries a gear 24 whereby the screen unit may be rotated at a relatively high speed, or about 700 R. P. M.

Projecting through hub 20 and through the screen unit to a point adjacent head 17 is a non-rotary water feed conduit 25 having a spirally arranged row of holes 26 within the length of the unit or between heads 16 and 17. A steam packing gland 27 is provided between hub 20 and the conduit, and the latter outwardly of the gland is held against rotation by a clamping saddle 28 mounted on bracket 23.

Adjacent the head 17 the conduit is closed by an extension 29 which extends beyond said head and is relatively journaled in a bearing spider 30 mounted on the steam chamber head 3 within the chamber, being held against relative axial movement by a nut 31. The head 17 is also journaled on said extension by means of a roller bearing unit 32 carried by said head. The conduit is thus supported at its inner end by the steam chamber while the screen unit at the corresponding end is also supported in connection with said chamber and the conduit.

A pressure oil-feed pipe 33 extends through a packing gland 34 in the back of fitting 11 to a connection with the adjacent end of extension 29, the latter being drilled to form oil passages 35 communicating with said pipe and with bearings 30 and 32. A spring 36 about pipe 33 acts on fitting 11 to force the same away from hub 9 and thereby maintaining the packing 12 and collar 13 in close steam-tight engagement until the steam pressure is sufficient to do so.

In operation, with a fire under the steam chamber and with the latter rotating slowly and the inner vaporizing or screen unit revolving rapidly, water under pressure greater than that of the steam to be generated is forced through conduit 25, discharging into the screen unit both at different points in the length thereof as well as in different directions radially, through the relatively small holes 26. The small jets of water impinge with some force against the rapidly rotating heated screens, which act to break up the jets and vaporize the water, which is thus immediately transformed into steam having the desired dry characteristics. The steam outside the vaporizing unit is retained within the outer chamber where it is further heated and dried by contact with the highly heated walls of the chamber. Since the latter is rotating, its entire area becomes recurringly exposed to the direct heat of the fire below, so that there is no tendency for said chamber to burn out.

Due to the arrangement and mounting of the separable parts of the generator, it will be seen that it is only necessary to remove the head 3 in order to withdraw the screen unit from within the outer chamber, should replacement due to encrustation of foreign matter on the screen, or other cause, render this necessary.

It will also be noted that the main bearings are out of the zone of direct heat, while those within the steam chamber are arranged so that they may be kept constantly lubricated from exteriorly of the generator.

It is also to be understood that the various exterior bearings are provided with suitable lubricating means, as well as the packing collar 13, the latter being preferably lubricated internally by a force feed arrangement.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A steam generator comprising a rotary screen drum, a steam retaining chamber enclosing the drum, and rotatable independently of said drum, a firebox about said chamber, and means to feed water into the drum.

2. A steam generator comprising a drum-like steam chamber, tubular end hubs projecting outwardly from the chamber, a firebox having spaced upstanding walls, the chamber being disposed between said walls with its axis horizontal, members engaging said hubs in supporting relation, a steam outlet fitting operatively connected with one hub, a rotary screen drum within the chamber coaxial therewith, a hub on one end of said drum turnably projecting through the other chamber hub, means applied to the outer end of the drum hub to rotate the same and means to feed water into the drum.

3. A structure as in claim 2 in which said water feed means comprises a relatively stationary conduit projecting axially through the drum hub and into the drum.

4. A structure as in claim 2 with means between the other end of the drum and the adjacent end of the chamber to support said end of the drum without interfering with the outflow of steam through the adjacent chamber hub.

5. A structure as in claim 2 in which said chamber is rotary and said chamber-hub engaging members are bearings disposed outwardly of the firebox, and means applied to one of said chamber hubs to rotate the chamber.

6. A steam generator comprising a drum-like steam chamber, tubular end hubs projecting outwardly from the chamber, a firebox having spaced upstanding walls, the chamber being disposed between said walls with its axis horizontal, members engaging said hubs in supporting relation, a steam outlet fitting operatively connected with one hub, a rotary screen drum within the chamber coaxial therewith, a hub on one end of said drum turnably projecting through the other chamber hub, means applied to the outer end of the drum hub to rotate the same, an orificed water feed conduit projecting axially through the drum hub and into the drum to adjacent its opposite end, a closure member on the inner end of said conduit, a bearing spider for said member mounted on the chamber interiorly thereof, and a bearing on the adjacent end of the drum also engaging said member.

7. A steam generator comprising a screen drum, means mounting said drum for rotation, means to feed water into the drum, a steam retaining chamber enclosing the drum and a firebox about the chamber; said drum comprising end heads, an outer screen cylinder secured on and extending between the heads and an inner screen cylinder, radially spaced from the outer cylinder, likewise secured on and extending between the heads.

8. A steam generator comprising a drum-like steam chamber, a firebox about said chamber, a tubular end hub projecting from the chamber, means supporting the chamber for rotation, a rotary screen drum within the chamber coaxial therewith, a hub on one end of the drum turnably projecting through and engaging said chamber hub, means to feed water into the drum, means to rotate the chamber and separate means applied to the drum hub outwardly of the chamber hub to rotate said drum hub.

9. A steam generator comprising a drum-like steam chamber, a firebox about said chamber, a tubular end hub projecting from the chamber, means supporting the chamber for rotation, a rotary screen drum within the chamber coaxial therewith, a hub on one end of the drum turnably projecting through and engaging said chamber hub, and a relatively stationary water feed conduit projecting axially through the drum hub and into the drum.

10. A steam generator comprising a drum-like steam chamber, a firebox about said chamber, a tubular end hub projecting from the chamber, means supporting the chamber for rotation, a rotary screen drum within the chamber coaxial therewith, a hub on one end of the drum turnably projecting through and engaging said chamber hub, means to feed water into the drum, a steam outlet at the other end of the chamber axially thereof, and means between the other end of the drum and the adjacent end of the chamber to support said end of the drum without interfering with the flow of steam through said outlet.

11. A steam generator comprising a drum-like steam chamber, a firebox about said chamber, a tubular end hub projecting from the chamber, means supporting the chamber for rotation, a rotary screen drum within the chamber coaxial therewith, a hub on one end of the drum turnably projecting through and engaging said chamber hub, means to feed water into the drum, a steam outlet at the other end of the chamber axially thereof, a member projecting through the drum hub axially thereof to a termination beyond the other end of the drum and adjacent the outlet end of the chamber, and a spider secured in the chamber about the outlet and in which the adjacent end of the member is turnably supported.

CHARLES E. WAGNER.